Aug. 29, 1950     W. L. DE BAUFRE     2,520,626
GAS LIQUEFACTION PROCESS AND APPARATUS
Filed April 5, 1945
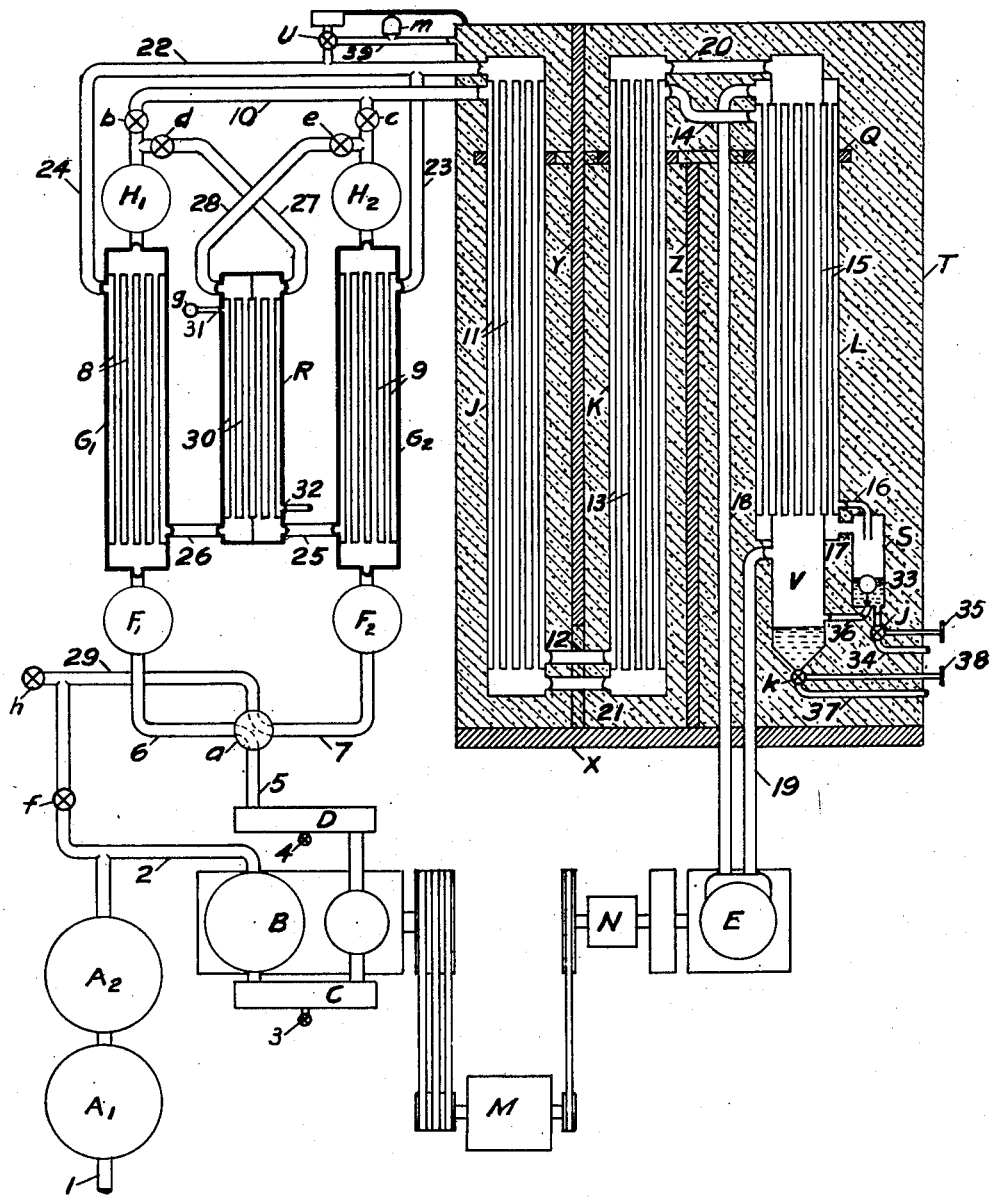
INVENTOR: Wm. L. de Baufre Patented Aug. 29, 1950

2,520,626

UNITED STATES PATENT OFFICE 2,520,626

GAS LIQUEFACTION PROCESS AND APPARATUS

William Lane De Baufre, Lincoln, Nebr.

Application April 5, 1945, Serial No. 586,798

6 Claims. (Cl. 62—123)

This invention relates to liquefaction of gases and is particularly applicable to liquefaction of atmospheric air. While a plant is described for production of liquid air, certain features of the process and the apparatus are useful in plants for extraction of the constituents of any gaseous mixture in either gaseous or liquid form by rectification after the gaseous mixture has been partly liquefied. Such apparatus may be classified as gas liquefaction apparatus.

Heretofore, liquid air plants have usually been built to operate with very high compressed air pressures, 3000 lb. gage or more, in order to obtain sufficient refrigeration by throttling the compressed air to atmospheric pressure after it has been regeneratively cooled to liquid air temperature. A few liquid air plants have been built with expansion engines to obtain the necessary refrigeration by expansion with performance of external work of a large part of the air compressed to a moderate pressure in order to liquefy the small remaining part.

The present invention utilizes an expansion engine, or an equivalent turbine, in a manner which makes the production of liquid air possible with low compressed air pressure. Instead of expanding one part of the compressed air from a temperature considerably above liquefaction temperature in order to cool and liquefy the other part, all the compressed air is cooled to the temperature of liquefaction and part of it is liquefied. The unliquefied gas is separated from the liquefied part, superheated above the temperature of liquefaction, and then expanded in an engine or turbine with performance of external work. The exhaust of the engine or turbine is used to cool and partly liquefy the compressed air.

This new process has the advantage that the compressed air before entering the engine or turbine is cooled approximately to the lowest temperature subsequently reached in the engine or turbine. In the older process, the compressed air was cooled only to the inlet temperature before being admitted to the engine or turbine. Consequently, ice and carbon dioxide particles were set free by further cooling in the engine or turbine to score piston packing, clog nozzles, etc. This is avoided in the new process by sub-cooling and then reheating the gas before admitting it to the engine or turbine.

In the new process, the compressed air is cooled in interchangers and further cooled and partly liquefied in a liquefier which are suspended from a framework and surrounded by a casing with the intervening space filled with heat insulating material. An improved arrangement has been adopted to facilitate erection and to maintain the heat insulating value of the insulating material.

Improvements are also included for removing water vapor from the compressed air before it is cooled in the interchangers. The unliquefied part of the compressed air after warming to about atmospheric temperature in the interchangers, can be utilized for reactivating the absorbent for water vapor and it can be returned to the suction of the compressor for recycling through the system.

The foregoing objectives together with such additional and subsidiary advantages as may hereinafter appear or are incident to the invention, are realized by the novel process and apparatus described herein and shown on the drawings as follows:

Figure 1 shows a schematic arrangement of a plant for liquefying atmospheric air in accordance with the above enunciated principles.

The apparatus shown in Figure 1 comprises:

(1) Scrubbing towers $A_1$ and $A_2$ for removing carbon dioxide from atmospheric air to be partly liquefied.

(2) Two-stage compressor B driven by motor M for compressing the atmospheric air.

(3) Intercooler C and aftercooler D for removing the heat of compression and condensing excess moisture in the air or other gas compressed.

(4) Expander E connected through speed changing device N to motor M and compressor B for expanding the unliquefied part of the compressed air with performance of external work and recovering this work to reduce the power for compressing the atmospheric air.

(5) Driers $F_1$ and $F_2$ containing absorbent material for reducing the partial pressure of water vapor in the compressed air.

(6) Coolers $G_1$ and $G_2$ for removing the heat of absorption from the compressed air.

(7) Driers $H_1$ and $H_2$ containing absorbent material for further reducing the partial pressure of water vapor in the compressed air.

(8) Interchangers J and K for cooling the compressed air by heat exchange with returning unliquefied gas separated from the liquefied part.

(9) Liquefier L for further cooling and partly liquefying the compressed air by heat exchange with returning unliquefied gas and also for superheating the unliquefied compressed gas before expanding it.

(10) Separator S for separating the unliquefied compressed gas from the liquefied air.

(11) Vessel V for collecting the liquefied air under reduced pressure.

(12) Heater R for warming the returning unliquefied gas before utilizing it to reactivate the absorbent material in driers F and H.

(13) Base X with partitions Y and Z and framework Q attached thereto for supporting interchangers J and K and liquefier L.

(14) Casing T attached to base X and surrounding interchangers J and K and liquefier L for holding heat insulating material in place.

(15) Device U or W for supplying dry gas to the insulating material as interchangers J and K and liquefier L are cooled to operating temperatures.

Referring to Figure 1, atmospheric air to be partly liquefied, enters the plant through pipe 1 and flows through scrubbing towers $A_1$ and $A_2$, where the atmospheric air is brought into contact with caustic solution to remove carbon dioxide therefrom. The carbon dioxide free air flows through pipe 2 to the first stage cylinder of compressor B. In the two stages of compressor B, the atmospheric air is compressed to 50 to 250 lb. gage, depending upon the fraction of the air to be liquefied.

Between the two stages of compressor B, the air is cooled in intercooler C. Condensed water vapor is removed form intercooler C by drain valve 3. After leaving the second stage of compressor B, the compressed air is cooled in aftercooler D. Condensed water vapor is removed from aftercooler D by drain valve 4. From aftercooler D, the compressed air flows through pipe 5 to four-way valve $a$.

Four-way valve $a$ is set as shown by the dotted lines so that the compressed air flows through pipe 6 to drier $F_1$. In drier $F_1$, the partial pressure of water vapor in the compressed air is reduced by absorption and the compressed air is warmed by the heat of absorption. Cooler $G_1$ removes the heat of absorption as the compressed air flows through tubes 8.

The partly dried and cooled compressed air then enters drier $H_1$ where the partial pressure of water vapor is further reduced by reason of the lowered temperature of the compressed air. The dried compressed air flows through non-return valve $b$ and thence through pipe 10 to interchanger J. The compressed air cannot flow through check valve $d$ which closes against flow in this direction.

Within the shell of interchanger J, the dried compressed air is cooled by heat exchange with returning low pressure gas flowing up through tubes 11. From the shell of interchanger J, the cooled compressed air flows through pipe 12 to the shell of interchanger K. Within the shell of interchanger K, the compressed air is further cooled by heat exchange with returning low pressure gas flowing down through tubes 13. The compressed air leaves through pipe 14 cooled 100 degrees or more below zero centigrade.

The cooled compressed air enters the shell of liquefier L where it is still further cooled and partly liquefied mainly by returning low pressure gas flowing up through tubes 15. Leaving through pipe 16, the partly liquefied air enters separator S where the unliquefied gas is separated from the liquefied part. The unliquefied gas returns through pipe 17 to liquefier L where it is superheated above the temperature of liquefaction as the gas flows up through the outer rows of tubes 15 in heat exchange with the compressed air being cooled and partly liquefied. The superheated gas leaves through pipe 18.

This superheated gas flows through pipe 18 to expander E where it expands to about atmospheric pressure with performance of external work. Expander E may be a reciprocating engine, a rotary engine, or a turbine. In any case, the expanded gas at reduced temperature returns through pipe 19 to liquefier L where the low pressure gas flows up through the inner rows of tubes 15. This low pressure gas is warmed to a temperature approaching minus 100 degrees centigrade when it leaves liquefier L through pipe 20.

Within tubes 13 in interchanger K, the returning low pressure gas is further warmed. This low pressure gas flows through pipe 21 to interchanger J where it is warmed nearly to atmospheric temperature while flowing up through tubes 11. The low pressure gas leaves interchanger J through pipe 22. Whether this low pressure gas flows through pipe 23 to cooler $G_2$ or through pipe 24 to cooler $G_1$ depends upon the position of four-way valve $a$.

With four-way valve $a$ set as indicated by the dotted lines so that pipe 7 is connected to outlet pipe 29, the flow of returning low pressure gas is as follows: Through pipe 24 to the shell of cooler $G_1$, through pipe 26 to tubes 30 within heater R, through pipe 28 to check valve $e$, through drier $H_2$, through tubes 9 within cooler $G_2$, through drier $F_2$, through pipe 7 to four-way valve $a$, and thence through outlet pipe 29. The returning low pressure gas cannot flow through pipe 23, cooler $G_2$, pipe 25, heater R and pipe 27 because check valve $d$ remains closed with compressed air on the other side of the valve with a higher pressure tending to produce a reverse flow.

In flowing through the shell of cooler $G_1$, the returning low pressure gas removes the heat of absorption from the compressed air flowing through tubes 8 from drier $F_1$. In flowing through one-half of tubes 30 within heater R, the returning low pressure gas is heated by steam supplied through valve $g$ and pipe 31, condensed steam being drained away through pipe 32. In flowing through driers $H_2$ and $F_2$, the absorbent material therein is reactivated by the heated returning low pressure gas which drives out the absorbed moisture.

After the absorbent material within driers $H_2$ and $F_2$ have been reactivated, valve $f$ can be opened to return the low pressure gas to suction pipe 2 of compressor B so that the low pressure gas will be compressed and recycled through the system. Valve $g$ can be closed when valve $f$ is opened because it is no longer necessary to admit steam to heater R in order to warm the returning low pressure gas. Valve $h$ on outlet pipe 29 may also be closed to insure that all of the low pressure gas returns to compressor B and also to prevent atmospheric air being drawn into the system except through scrubbing towers $A_1$ and $A_2$ where it is freed of carbon dioxide.

In case of liquefying some other gas than atmospheric air, the plant may be operated at all times with valve $h$ closed after the atmospheric air originally in the plant has been flushed out of the system. In such case, pipe 1 is connected to the source of the gas to be liquefied. Only sufficient fresh gas is drawn into the system as may be necessary to make up for the part liquefied and removed. This fresh make up gas, however, will carry water vapor into the system. Removal of this water vapor is accomplished through drain valves 3 and 4 on intercooler C and aftercooler D. During continuous operation, moisture will be transferred back and forth between driers $F_1$ and $H_1$ and driers $F_2$ and $H_2$ as four-way valve $a$ is shifted from one position to the other position.

The liquefied fraction of the compressed air or other gas in separator S is automatically discharged as rapidly as it accumulates by means of float controlled valve 33. A device such as described in U. S. Patent 2,062,781, issued December 1, 1936, may be used for this purpose. The liquefied gas under pressure may also be removed through pipe 34 by valve $j$ with a long stem to operating handle 35 outside casing T.

Usually, the liquefied gas is automatically discharged through pipe 36 into vessel V where the pressure is but slightly above atmospheric pressure because vessel V is connected to tubes 15 within liquefier L. Due to reduction in pressure, a small amount of the liquefied fraction is vaporized and returns through tubes 15 commingled with the expanded gas returning from expander E through pipe 19. The low pressure liquid air may be removed through pipe 37 by valve $h$ with long stem to handle 38 outside casing T.

Interchangers J and K, liquefier L, separator S and vessel V operate at temperates below atmospheric temperature, and must therefore be covered with insulation to reduce heat leak into the apparatus. These parts must also be supported in a manner which will conduct little heat into them from the surroundings. This is accomplished by suspending these parts in a framework Q of commercially dry wood or other material of correspondingly low heat conductivity. Framework Q is attached to or forms part of partitions Y and Z which are attached to base X. Casing T surrounds the cold apparatus and is also attached to base X. The space around interchangers J and K, liquefier L, separator S and vessel V within casing T, is filled with heat insulating material.

This insulation is a porous material with the interspaces originally filled with air at atmospheric pressure and temperature. As interchanges J and K and liquefier L are cooled to operating temperatures, the average density of this air increases with the result that the pressure within casing T tends to fall below atmospheric pressure. When this has occurred heretofore in gas liquefaction plants, atmospheric air containing water vapor has been drawn into the insulation through crevises in the casing. Part of the water vapor has been condensed and some has been frozen in the interspaces of the insulation. When the apparatus was again warmed to atmospheric temperature, part of the moisture remained in the insulation. Over a period of years the insulation became very moist. The accumulation of moisture was accelerated during normal operation by convection currents through crevices in the casing.

In order to reduce and largely prevent accumulation of moisture in the insulation, dried air or other dried gas is supplied to the space within casing T as the apparatus is cooled to operating temperatures. In a liquid air plant, the returning low pressure gas separated from the liquefied fraction of the air, is very dry due to its having been cooled to the temperature of liquid air. After warming to about room temperature, this dry gas is supplied to casing T through pipe 39 by means of pressure regulating valve U mounted on pipe 22. Regulating valve V is set to open whenever the pressure in casing T drops to about atmospheric pressure or preferably to a pressure slightly above atmospheric pressure. Pipe 39 is connected to casing T at a point in the region of the upper end of interchanger J where the temperature remains about atmospheric as the remainder of the apparatus within casing T is cooled below atmospheric temperature. This location causes less disturbing convection currents within the insulation than if the dried air were admitted elsewhere.

When the cold apparatus is warmed again to room temperature, the gas pressure within casing T tends to rise above atmospheric pressure. This closes regulating valve U. In order to prevent excessive pressure within casing T, relief valve $m$ is installed on pipe 39 and is set to open at a pressure slightly higher than that at which regulating valve U closes.

If some other gas than air is being liquefied, it may not be desirable to admit this gas to the insulating material within casing T. Some other source of dried gas under pressure may then be used with pressure regulating valve U. If no other source is readily available, air may be drawn into the casing from the atmosphere through a vessel filled with some absorbent for reducing the partial pressure of water vapor. This absorbent material can be replaced or re-activated when necessary.

During normal operation of this liquid air plant, atmospheric air is sucked into compressor B at a constant rate determined by the constant rotative speed of motor M. This air flows through scrubbing towers $A_1$ and $A_2$ where the carbon dioxide is removed. The compressed air is dried in driers $F_1$ and $H_1$ and is then cooled in interchangers J and K and partly liquefied in liquefier L. The unliquefied gas returns through liquefier L where it is superheated. It then flows at the superheated temperature and substantially at the compression pressure to expander E. Whatever the type, expander E is capable of expanding a given volume of gas per unit of time at a certain temperature and pressure.

Assume an engine type of expander E with speed changing device N connected to compressor B through motor M. With speed changing device N set at a given speed ratio, there is a fixed relation between the volume of superheated gas entering expander E and the volume of atmospheric air entering compressor B. Consequently, the system will settle down to a corresponding compressed air pressure. At this compressed air pressure, a definite fraction of the compressed air will be liquefied in liquefier L. This liquefied air may be drained from separator S through tube 34 and valve $j$ operated by handle 35. The liquefied air will usually be automatically discharged into vessel V where it accumulates and can be removed through tube 37 and valve $k$ operated by handle 38.

By adjusting speed changing device N so that expander E runs at a lower speed relative to compressor B, a higher compressed air pressure is needed to pass the same mass of unliquefied gas through expander E. The external work of expander E will then increase with a corresponding increase in the fraction of liquefied gas accumulated in vessel V. That is, by varying the compressed air pressure, the fraction of liquefied air or other gas can be adjusted to that desired within the capacity of the plant.

If expander E is of the turbine type, a similar change in the compressed air pressure and the fraction of gas liquefied could be produced by increasing or decreasing the number of expanding nozzles in operation. Variation in the capacity of the expander relative to the capacity of the compressor is effected in the case of a turbine expander by changing the number of nozzles in operation as compared with changing the rotative speed of an engine expander.

At regular intervals during the normal operation of the plant, four-way valve $a$ is shifted from the position shown where the compressed air flows through driers $F_1$ and $H_1$ to the alternate position where the compressed air flows through driers $F_2$ and $H_2$. The returning low pressure gas flows through whichever pair of driers are not used to dry the compressed air. The returning low pressure gas is heated to reactivate the absorbent material.

Condensed moisture is drained at intervals from intercooler C and aftercooler D through drain valves 3 and 4 respectively. It is also necessary at intervals to replenish the caustic solution in scrubbing towers $A_1$ and $A_2$ for removing carbon dioxide from the gas to be partly liquefied.

Valve $f$ may be opened when it is desired to recycle the returning low pressure gas through the system. Valve $h$ may be closed when it is desired to recycle all the returning gas. Valve $g$ may be closed when it is deemed unnecessary to continue reactivation of the absorbent material.

Otherwise, normal operation of the plant is automatic with no continuous attention necessary by an operator. The compressed air pressure and the amount of liquefied gas produced will vary slightly from time to time depending mainly upon the temperature of the surroundings. It may be desirable to carry a somewhat higher compressed air pressure in summer than in winter by adjustment of speed changing device N in case of an expansion engine or by changing the nozzles of an expansion turbine.

Over long periods of time, the efficiency of the plant will be maintained by reason of freedom from accumulation of water and ice in the insulating material, which is prevented by supplying dried gas to the insulation within the casing as the apparatus is cooled to operating temperatures. During normal operation, the apparatus within the separation unit operates at high efficiency by reason of reduction in convection currents between adjacent parts at different temperatures.

In some plants, interchangers in duplicate may be desirable as well as driers in duplicate. In such plants, one interchanger would be operating at low temperature while the adjacent one would be at room temperature or above. In such cases, partitions will be used between adjacent interchangers one of which is in use while the other is being warmed for defrosting. This case is covered by the broad wording of certain claims. Also, the wording of the claims does not preclude inclusion of other apparatus in the same compartments with the interchangers and the liquefier. The claims apply to apparatus for separating gaseous mixtures by rectification since it is first necessary to cool and partly liquefy the gaseous mixtures so that such apparatus may be classified as gas liquefaction apparatus.

I claim:

1. Gas liquefaction plant including a compressor for compressing a gas, an interchanger for cooling the compressed gas, a liquefier for further cooling and partly liquefying the compressed gas, means for separating the unliquefied gas from the liquefied part of the compressed gas, means for returning the unliquefied gas through the liquefier in heat exchange with the compressed gas whereby the unliquefied gas is superheated, an expander for expanding the superheated gas with performance of external work, means for returning the expanded gas through the liquefier and the interchanger in heat exchange with the compressed gas whereby the expanded gas is warmed, and means for returning the warmed expanded gas to the compressor for recycling through the apparatus.

2. Gas liquefaction apparatus as in claim 5 wherein the means for discharging the liquefied part of the compressed gas is automatically controlled by the liquid level within the separator.

3. Process of liquefying a gas which includes compressing the gas, cooling the compressed gas until a fraction thereof is liquefied, separating the unliquefied gas therefrom, superheating the unliquefied gas by heat exchange with the compressed gas, expanding the superheated gas with performance of external work, utilizing the expanded gas to cool and partly liquefy the compressed gas, and then recompressing and recycling the expanded gas whereby the fresh gas entering the system is reduced to the amount liquefied and withdrawn from the system.

4. Process of liquefying atmospheric air which includes compressing the atmospheric air, cooling the compressed air at substantially constant pressure until a fraction thereof is liquefied, separating the unliquefied gas therefrom, superheating the unliquefied gas by heat exchange with the compressed air, expanding the superheated gas with performance of external work, withdrawing the liquefied fraction of the compressed air and reducing the pressure thereon whereby a portion is vaporized, commingling the vaporized portion with the expanded gas and utilizing the mixture to cool and partly liquefy the compressed air.

5. Gas liquefaction apparatus including a liquifier for cooling and partly liquefying a compressed gas, a separator for separating the unliquefied gas from the liquefied part of the compressed gas, means for returning the unliquefied gas under the pressure of compression through the liquefier in heat exchange with the compressed gas, an expander for expanding the returned unliquefied gas with performance of external work, means for returning the expanded gas through the liquefier in heat exchange with the compressed gas, a vessel under the pressure of the expanded gas, means for discharging the liquefied part of the compressed gas from said separator into said vessel, and means for returning the vapor produced by reduction in pressure through the liquefier commingled with the expanded gas in heat exchange with the compressed gas.

6. Gas liquefaction apparatus as in claim 5 including means for withdrawing from the apparatus liquefied gas from said separator or from said vessel.

WILLIAM LANE DE BAUFRE.

(References on following page)

REFERENCES CITED

The following references are of record in the file of this patent:

UNITED STATES PATENTS

| Number | Name | Date |
|---|---|---|
| 427,240 | Nason | May 6, 1890 |
| 1,020,103 | Linde | Mar. 12, 1912 |
| 1,119,159 | Hildobrandt | Dec. 1, 1914 |
| 1,188,191 | Mewes | June 20, 1916 |
| 1,537,193 | Roberts | May 12, 1925 |
| 1,675,228 | Schmidt | June 26, 1928 |
| 1,682,588 | Wietzel | Aug. 28, 1928 |
| 1,696,558 | Van Nuys | Dec. 25, 1928 |
| 1,939,693 | Hasche | Dec. 19, 1933 |
| 1,961,202 | De Baufre | June 5, 1934 |
| 1,987,422 | Steenstrup | Jan. 8, 1935 |
| 2,062,781 | De Baufre | Dec. 1, 1936 |
| 2,083,732 | Moore et al. | June 15, 1937 |
| 2,085,677 | Thayer | June 29, 1937 |
| 2,128,692 | De Baufre | Aug. 30, 1938 |
| 2,256,421 | Borchardt | Sept. 16, 1941 |
| 2,284,914 | Miller | June 2, 1942 |